(12) United States Patent
De Jong

(10) Patent No.: US 8,186,625 B2
(45) Date of Patent: May 29, 2012

(54) FLEXIBLE VESSEL

(75) Inventor: Maxim De Jong, Chilliwack (CA)

(73) Assignee: The Thin Red Line Aerospace Ltd., Chilliwack (CA)

( * ) Notice: Subject to any disclaimer, the term of this patent is extended or adjusted under 35 U.S.C. 154(b) by 0 days.

(21) Appl. No.: 11/463,560

(22) Filed: Aug. 9, 2006

(65) Prior Publication Data

US 2008/0078883 A1    Apr. 3, 2008

(51) Int. Cl.
*B64G 1/00* (2006.01)

(52) U.S. Cl. .................................... 244/158.3

(58) Field of Classification Search ............ 244/158.3, 244/159.2, 173.1, 173.2, 172.1, 171.9, 31, 244/30; 52/2.17, 2.18; 446/225, 220
See application file for complete search history.

(56) References Cited

U.S. PATENT DOCUMENTS

| | | | | |
|---|---|---|---|---|
| 2,501,670 | A * | 3/1950 | Fogal | 244/145 |
| 2,679,224 | A * | 5/1954 | Sturtevant | 114/54 |
| 2,767,940 | A * | 10/1956 | Melton | 244/31 |
| 2,919,082 | A * | 12/1959 | Winzen et al. | 244/31 |
| 3,531,064 | A * | 9/1970 | McCutchan | 244/31 |
| 4,113,208 | A * | 9/1978 | Manfredi | 244/139 |
| 4,166,597 | A * | 9/1979 | Seifert et al. | 244/158.3 |
| 4,434,958 | A * | 3/1984 | Rougeron et al. | 244/126 |
| 5,104,059 | A * | 4/1992 | Rand et al. | 244/31 |
| 5,356,097 | A * | 10/1994 | Chalupa | 244/139 |
| 6,231,010 | B1 | 5/2001 | Schneider et al. | |
| 6,237,875 | B1 | 5/2001 | Menne et al. | |
| 6,290,172 | B1 * | 9/2001 | Yajima et al. | 244/31 |
| 6,315,242 | B1 * | 11/2001 | Eichstedt et al. | 244/30 |
| 6,321,746 | B1 * | 11/2001 | Schneider et al. | 128/202.12 |
| 6,360,988 | B1 * | 3/2002 | Monroe | 244/31 |
| 6,382,557 | B1 * | 5/2002 | Lafuma et al. | 244/12.2 |
| 6,439,508 | B1 | 8/2002 | Taylor | |
| 6,547,189 | B1 * | 4/2003 | Raboin et al. | 244/158.3 |
| 6,685,136 | B2 * | 2/2004 | Yajima et al. | 244/31 |
| 2001/0010231 | A1 * | 8/2001 | Johnson et al. | 135/25.1 |
| 2003/0071168 | A1 * | 4/2003 | Barnes, III | 244/30 |

(Continued)

FOREIGN PATENT DOCUMENTS

DE    19837329    11/1999

(Continued)

OTHER PUBLICATIONS

Cadogan, D., et al., "Inflatable Composite Habitat Structures for Lunar and Mars Exploration", *49th International Astronautical Congress*. Sep. 28-Oct. 2, 1998, Melbourne, Australia, (1998), 9 pgs.

(Continued)

*Primary Examiner* — Rob Swiatek
*Assistant Examiner* — Valentina Xavier
(74) *Attorney, Agent, or Firm* — Schwegman, Lundberg & Woessner, P.A.

(57) ABSTRACT

A flexible vessel includes a restraint structure and a barrier structure. The restraint structure further includes a first portion, and a second substantially rounded end cap portion that is attached to the first portion. The restraint structure also includes an array of tendons. The barrier structure is positioned within the restraint structure. When the barrier contains a fluid, a portion of the load is carried by the restraint structure and another portion of the load is carried by the barrier structure. The flexible vessel is collapsible to occupy a first volume and distended to occupy a second volume. The flexible vessel is part of a system when used in various applications with respect to a craft.

18 Claims, 9 Drawing Sheets

U.S. PATENT DOCUMENTS

2005/0108950 A1 5/2005 Bigelow
2005/0120638 A1 6/2005 Bigelow

FOREIGN PATENT DOCUMENTS

EP 1319593 A2 6/2003
FR 2780945 1/2000

OTHER PUBLICATIONS

European Search Report—Appln. No. 07253117.1-2422, dated Oct. 26, 2007; 7 pages.
"Application Serial No. 07253117.1, Office Action Mailed onDec. 8, 2008", 5 pgs.

* cited by examiner

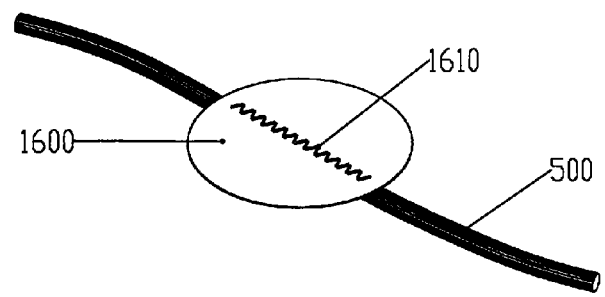
*FIG. 16*
*FIG. 17*
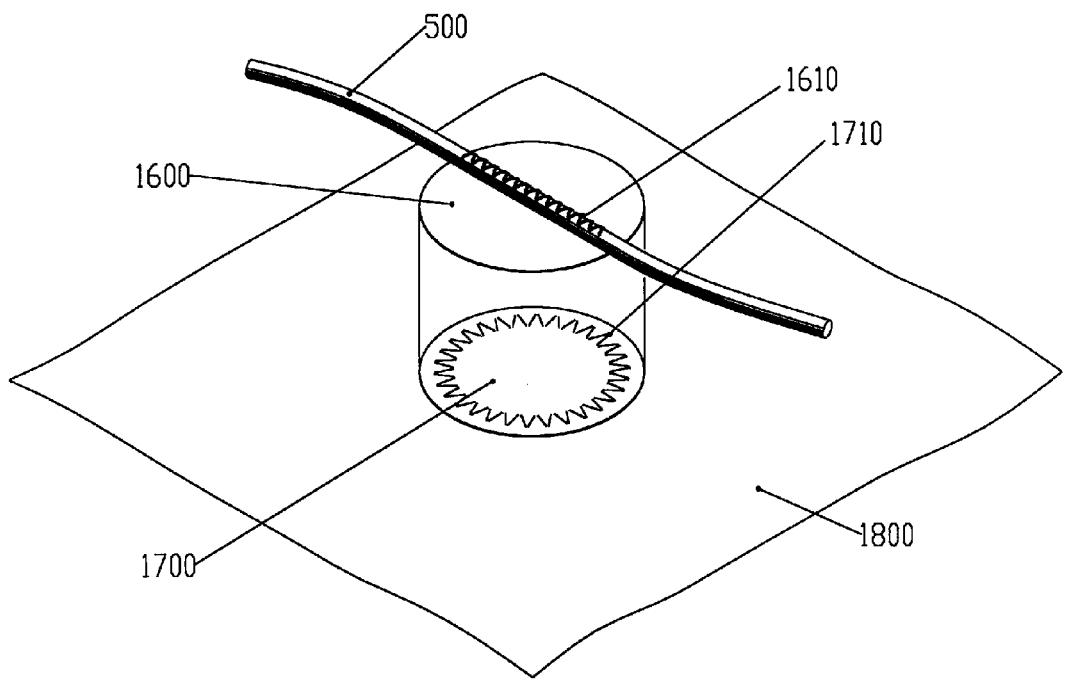

FLEXIBLE VESSEL

FIELD OF THE INVENTION

This invention relates generally to flexible vessels for the containment of gaseous or liquid fluids. More particularly, the invention is capable of high strength-to-weight ratio construction, of carrying high pressure induced stress, and may furthermore be collapsed to occupy a relatively small volume, and distended to retain a relatively large internal volume. As such, the invention is a particularly suitable pressure confining structure for incorporation into architecture deployed in outer space and on or about celestial bodies.

BACKGROUND

Specialized markets provide continuous impetus for the development of high performance pressure vessels. Performance is measured across a set of desirable attributes which differ in priority depending on the vessel's intended application. Two commonly identified primary performance attributes are robustness and high strength-to-weight ratio. Vessels engineered for operation in environments of lower pressure than required within the vessel can take advantage of the tensile stability offered by a flexible structure—with the conspicuous benefit, amongst others, of potential collapsibility and superior strength-to-weight ratio. The benefits derived from flexible architecture become more significant in operational environments of diminished gravitational force and especially in the vacuum of deep space.

Considerable interest in flexible pressure vessels therefore exists in the field of space exploration. This interest has been bolstered by the inescapable reality that the present launch cost for payload to Low Earth Orbit is high. A very rough yet optimistic ballpark estimate places launch costs at about US$10,000 per kilogram and almost $1 million per cubic meter. Consequently a pressure vessel which can be launched from Earth aboard a vehicle commensurate in size to the vessel's collapsed volume, to a destination in space where the vessel is subsequently deployed, will provide significant savings related to launch costs. A third primary performance attribute is a high 'deployment efficiency ratio' whereby the ratio of internal volume presented by the vessel after deployment is maximized with respect to the volume occupied by vessel when collapsed for packaging and transport. Flexible vessel structures used in space exploration demand the adequate fulfillment of the three performance attributes mentioned: robustness, high-strength-to-weight ratio, and high deployment efficiency ratio.

With the advent of a new generation of fiber technology in the 1990's, exemplified by the liquid crystal polymer Vectran® of Kuraray Co., Ltd., and PBO (Phenylene Benzobisoxasole), designers have been able to push the specific strength envelope far back while simultaneously broadening the spectrum of operable space environments for their architecture. Two dimensional gores can be cut from planar sheets of material to subsequently be connected edge to edge to reproduce a close facsimile of a fully closed three dimensional shell. A breakthrough that helped usher in the current era of 'soft systems engineering' was the successful application of airbags made from Vectran® fabric to cushion the 1997 NASA Pathfinder mission's landing on Mars. More recently, the same technology was used on a larger scale to safely land the beloved twin Rovers, Spirit and Opportunity, on Mars.

Fabric Gore Vessels

A representative example of current collapsible flexible pressure vessel art is the airbag system which cushioned the landing of NASA's exploration rovers on Mars: Built of woven fabric gores, the airbags were engineered for approximately 35 kilograms per centimeter membrane stress while needing to be of extremely high strength-to-weight construction, packaged very tightly, and exposed to a great variety of environmental extrema.

In general, only products comprised of high modulus fibers are considered viable for construction of load bearing components of high performance flexible pressure vessels since these fibers exhibit a tensile strength typically two to four times greater than nylon or polyester. While low elongation is a great benefit for maintaining vessel geometry, it becomes an Achilles' heel if the vessel is not meticulously engineered: Due to their high modulus it is difficult to guarantee proper load sharing between individual fibers within a woven fiber product, thereby making any interface, joint, or seam the potential point load induced source of chain reaction failure. This does not ultimately bode well for 'broad' fabrics since, the greater the width of the weave, the more difficult it becomes to precisely balance the load sharing between individual fibers.

The ultimate strength limitation which precludes use of fabric gore vessels in high load applications stems from the aforementioned inefficiency of fiber load sharing in broad fabrics combined with the necessity that individual meridional gores must be cut in a lens shape to allow for the assembly of the intended three dimensional pressure shell. When such a tapered gore profile is cut from a planar fabric, the load bearing fibers corresponding to the vessel shell's circumferential stress direction are severed, as are the meridional fibers where they intersect the gore edges converging on the poles. Consequently, the degree of preservation of the structural integrity of the vessel's shell relies almost entirely on how well load carrying pathways between adjacent gores are maintained across the meridional seams connecting the gores. Unfortunately, broad fabric cross-seam strength loss is always substantial, often over 40% for high performance fabric woven of high modulus fiber. Moreover, if higher membrane stresses require application of thicker fabric, the seam will carry a yet lower percentage of the base fabric strength due to the decreased load sharing precision amongst the greater number of fibers. Multiple layers of fabric are sometimes used to avoid thick mono-layers, however load sharing between fabrics constructed of high modulus fiber becomes not only an immense integration challenge but a nightmare due to rampant manifestation of indeterminate load pathways. A further limitation posed by heavier fabric structures is the increased seam sewing difficulty, most dramatically manifesting itself in the polar areas of meridional seam convergence and often the ultimate limiting factor in fabric gore structure design performance. Finding a solution to the meridional bulk convergence problem is one of the great recurring challenges in flexible vessel design.

Hybrid Vessels

Hybrid vessels comprise a substantially impervious barrier structure confined by an open grid of meridional and/or circumferential tendons made of webbing or cordage. Hybrid design is based on the premise that materials providing the surface coverage and impermeability necessary for the containment of the vessel's fluid contents are not ideal for simultaneously bearing the vessel's global pressure and mass loads and vice versa. Segregating material roles provides vastly greater design flexibility allowing the structure to be much more precisely tailored to application demands. Furthermore, the replacement of a single specialized 'do it all' material by a variety of materials chosen to each perform a specific function facilitates off-the-shelf component availability.

The barrier structure of the hybrid vessel is prepared oversized or with sufficient elasticity with respect to the restraining grid of tendons such that the vessel's global pressure confining stresses are carried by the restraint, while the barrier carries only the local pressure induced stresses generated where the barrier bulges outwards between restraint tendons. This approach to flexible vessel design opens the door to the capability of higher strength-to-weight efficiency and can be effectively tailored to very specific applications.

The drawback of hybrid vessels is the fact that no convenient solution has been found to maintain circumferential tendon hoops correctly positioned on the vessel's steep end cap surfaces. The end cap is an axially terminal end-closing structure of a pressure vessel. The problem has generally been circumvented by replacing what would have ideally been flexible end caps with rigid end plates or caps akin to those used to close the ends of metal or composite pressure vessels. Natural Shape Hybrid Vessels—the Vessel of the Current Invention As evidenced above, a cornerstone challenge in flexible vessel design is the development of correspondingly flexible end caps. In 1919, Sir Geoffery Taylor found when he reinforced a rubber weather balloon with meridional cords the balloon assumed a peculiar, oblate spheroidal, axial profile. He ultimately applied calculations correlating this geometry to characterize the shape assumed by certain descending parachutes [1].

This is significant because almost unwittingly a viable end cap is presented through simple, although perhaps counterintuitive, elimination of the entire circumferential portion of a hybrid vessel's restraint structure. The requirement for obtaining this default shape is simply the provision of a vessel with a restraint of meridional tendons and that there is sufficient excess barrier structure material to allow the barrier to form meridional lobes bulging outwards between the meridional tendons thereby precluding the barrier's carriage of any of the global circumferential stress of the vessel. The resulting geometry is referred to as the 'natural shape' of a flexible vessel and can be described as the geometry of equilibrium found when, through elimination of circumferential stress, the global pressure confining stress of the vessel is carried only by the meridional tendons.

While the calculational theory behind the natural shape was sporadically revisited during the five decades following Taylor's observations, notably by Upson [2], no commercial impetus for its application appeared on the horizon until modern materials such as Mylar® and Kevlar® of E.I. du Pont de Nemours and Company supported scientific and strategic interest in exploration of the upper atmosphere [3]. The only significant application of natural shape vessel design to date has been in the realm of giant high altitude balloons. With respect to the field of the current invention there are two drawbacks presented by the aforementioned balloon technology in general. Firstly the capability of these vessels is limited to extremely thin, low pressure membranes, and secondly, there is no provision for a vessel specifically intended to present both collapsed and deployed configurational functionality.

BRIEF SUMMARY OF THE INVENTION

A vessel includes a substantially impervious barrier membrane structure confined by a restraint structure including a meridional array of tendons disposed between and connecting two polar end structures. The barrier is prepared oversized with respect to the global geometry of the vessel's restraining tendon structure such that the barrier fabric bulges outwards between restraint tendons. Since membrane stress is proportional to the radius of the distended membrane, rather than carrying the global membrane stress of the vessel, the barrier is subjected only to the local pressure induced stress corresponding to the relatively small radius of the barrier fabric bulges. While the restraint structure bears the global pressure confining load of the vessel, the strength requirement of the barrier structure remains independent of overall vessel size.

The restraint structure of the vessel comprises only a meridional array of tendons and two flexible end structures whereby the distended vessel assumes a very particular 'natural shape' geometry, resembling an axisymmetric oblate spheroid. The natural shape is not mathematically identical to a spheroid, however because the two shapes are visibly almost indistinguishable, the natural shape is commonly described in literature and described hereinafter simply as a spheroid.

The vessel default provides a stable default geometry. The reliability provided by the default geometry can be further bolstered by incorporating at least one high modulus carrier layer into the barrier structure to eliminate excessive bulging which could lead to undesirable meridional stress in the oversized barrier. By precluding meridional tautness in the barrier, the vessel of the invention substantially enjoys statically determinate global stress distribution. The combination of an inherently stable deployed configuration and predictable global stress distribution is instrumental in providing a reliable, versatile and robust vessel well adapted to the operational functionalities required for deployment in space environments.

Sectioning the spheroid of the aforementioned example restraint embodiment at its equator and connecting each of the two resulting hemispheroidal end caps to the respective open ends of a cylinder provides an alternate, elongate example embodiment resembling a conventional pressure vessel and allowing additional configurational and dimensional flexibility. The cylinder's constant diameter is maintained by the addition of a circumferential component to the vessel's restraint which, depending on requirements, comprises fabric or parallel hoops of tendons or straps. Similarly, to create the characteristically tapered profile of a space capsule or re-entry ballute, the spheroid is sectioned on a parallel other than the equator and the resulting natural shape end caps are resized to fit the ends of a frustoconical center section. The natural shape is maintained as default geometry within the vessel's end caps regardless of the parallel partitioning of the spheroid of the invention's basic embodiment.

Each polar end structure of the vessel may be rigid or flexible depending on requirements. Without compromise in strength, the vessel can be manufactured as a fully functional embodiment without incorporation of any significant rigid components such as rigid end structures or internal core thereby further broadening the vessel's potential range of application, as well as having greater compressibility, lighter weight, greater robustness, and reduced cost.

An example embodiment of an individual flexible end structure of the vessel's restraint structure comprises adequate length of high modulus cordage to allow the cord to be threaded multiple times through the eyes of one polar end of all the restraint tendons. The ends of the end structure cordage are subsequently fastened to one another to form a ring structure of several strands to which the tendons are structurally connected. Larger vessels and higher pressure loads may favor incorporation of several such ring structures positioned concentrically to serve as a single polar end structure to allow staggered attachment of tendons to suitably accommodate increased tendon convergence bulk.

Conversely, the vessel of the invention may incorporate a rigid end structure at one or both vessel poles or a mating structure such as a docking bay, air lock or the like, to which the vessel's tendons are structurally attached by common methods. If configurationally permitted, the present vessel's end structure may be prepared with a flexible end structure of adequately large aperture to allow its fitment to the mating structure. In general, the invention's flexible end structure embodiment allows great versatility and facilitates significant opportunity for the vessel's modular combination with, or integration into, other architecture.

The vessel of the present invention provides a barrier structure which is the vessel's substantially impervious barrier membrane for the containment of pressurized gaseous or liquid fluids interior to the membrane. The barrier structure comprises at least one high-modulus structural carrier layer confining one or more substantially impervious bladder layers. A connection system of sufficient strength to maintain its integrity throughout the vessel's operational parameters is provided to accurately index the barrier structure to the inside of the vessel's meridional array of restraint tendons and to allow modular assembly of the aforementioned components.

In an example embodiment, the invention provides for a method of manufacture for the barrier structure whereby two substantially planar circles of barrier structure material are sealingly connected to one another along their edges whereby the three dimensional natural shape is effectively derived from the pressurization of this simple two dimensional barrier structure. With the subsequent connection of a suitably dimensioned restraint structure to the barrier structure, excess barrier structure material presented upon the vessel's pressurization is restructured into an array of lobes bulging outwards between the members of the corresponding array of restraint tendons thereby facilitating the beneficial stress distribution described earlier. The resulting embodiment of the vessel of the present invention provides simple, modular vessel assembly.

In circumstances favoring incorporation of an internal structural core, the vessel of the present invention thereto provides in a embodiment a vessel including an elongate telescopic internal core disposed lengthwise between and connected to the two polar end structures, whereby the shortened core corresponds to the distended, deployed configuration of the vessel's flexible shell, and whereby the core, when extended, pushes the end structures apart allowing the shell to collapse and align itself with the core. Further benefits of a structural core are dependent upon application of the vessel but may include structural integrity to support rocket launch induced stress and housing for infrastructure such as avionics and life support systems.

BRIEF DESCRIPTION OF THE DRAWINGS

The invention is pointed out with particularity in the appended claims. However, a more complete understanding of the present invention may be derived by referring to the detailed description when considered in connection with the figures, wherein like reference numbers refer to similar items throughout the figures and:

FIG. 16 is an isometric detail view of a method for fastening an indexing tab to a restraint tendon according to an example embodiment.

FIG. 17 is an isometric detail view of a method for locally fastening a restraint tendon to the vessel's barrier structure according to an example embodiment.

DETAILED DESCRIPTION

In the following detailed description of the example embodiments, reference is made to the accompanying drawings that form a part hereof, and in which are shown by way of illustrating specific example embodiments. The example embodiments illustrated are described in sufficient detail to enable those skilled in the art to practice the teachings disclosed herein. Other example embodiments can be utilized and derived therefrom, such that structural and logical substitutions and changes can be made without departing from the scope of the claims. The following detailed description, therefore, is not to be taken in a limiting sense, and the scope of various embodiments is defined only by the appended claims, along with the full range of equivalents to which such claims are entitled.

The example embodiments described below are illustrative of the so-called 'multidisciplinary technology' common in space architecture where highly complex devices are required to perform with the utmost reliability in a great variety of circumstances and environments and hence draw upon a multitude of different arts. The successful manufacture of these various example embodiments, particularly for space applications, is reliant upon skills from different arts including mechanical engineering, pressure vessel construction, technical fabric sewing and polymer film sealing and bonding.

Figure 1:
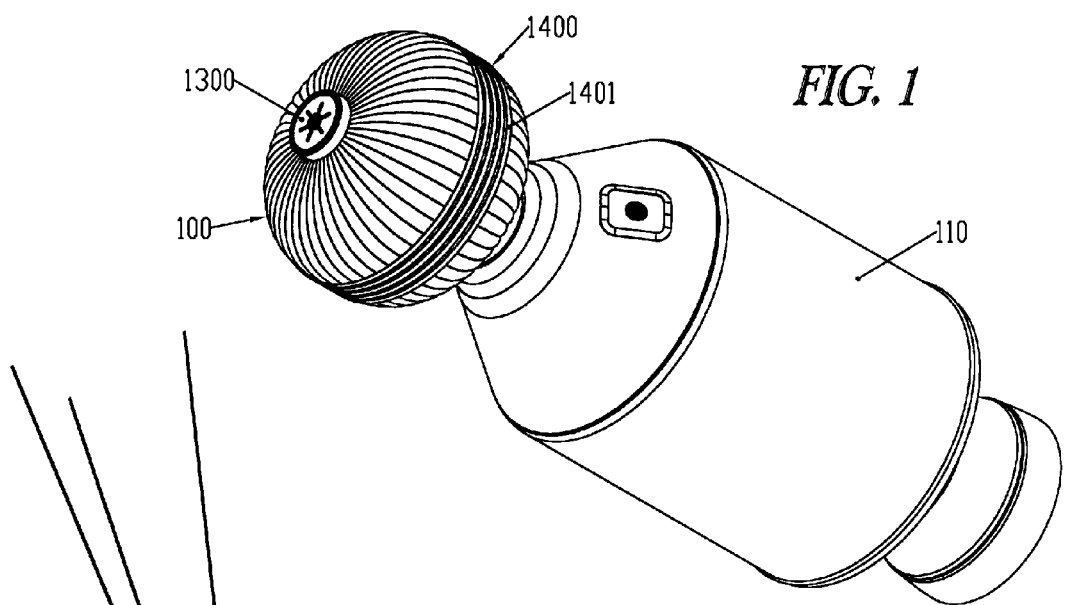
FIG. 1 is a simplified perspective view of a vessel used as a spacecraft airlock according to an example embodiment.

FIG. 1 is a view of a vessel 100 that is docked to a spacecraft 110 for use as an airlock. A rigid end structure 1300 of the vessel 100 provides a convenient location for a pass through for docking purposes or to allow access to the outside environment from the assembled spacecraft 110 and vessel 100 stack. The vessel may therefore similarly be used as a docking or berthing tunnel or module providing a suitable means of transport between two or more architectures. The aforementioned architectures can be modules, vehicles, or constructs upon the surface of a celestial body.

Figure 2:
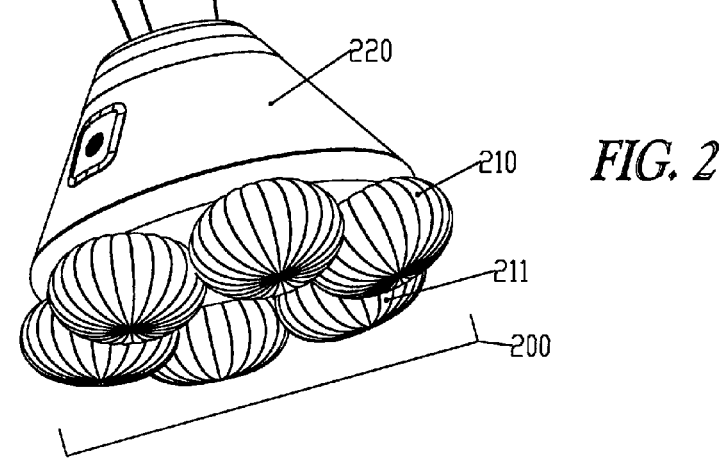
FIG. 2 is a simplified perspective view of vessels used in an impact force attenuating system according to an example embodiment.

FIG. 2 is a schematic view of a landing impact force attenuation system 200 that includes a plurality of vessels, such as vessels 210 and 211, according to an example embodiment. As shown in FIG. 2, a body 220 has attached thereto the first vessel 210 and the second vessel 211. The body 220 can be a lunar landing module or a Martian landing module or any type of module, capsule or craft that is used to land upon the surface of celestial body. For transport of the body 220 to the desired vicinity of a celestial body the vessels 210 and 211 can be folded or undeployed or collapsed. To land the body 220 on a celestial surface, the vessels 210 and 211 are pressurized with a suitable fluid and are thereby deployed. The vessels 210 and 211 function to attenuate the impact forces associated with the aforementioned landing of the body 220. After landing the vessels 210 and 211 can be repacked for future deployment. By undeploying or repacking the vessels 210 and 211 the vessels are also positioned so as not to interfere with any vehicle or mechanism used to launch or propel the body 220 back into space. It should be noted that the vessels 210 and 211 can be of any shape or size commensurate to the performance requirements of the system 200. It should furthermore be noted that, depending on application, the impact force attenuation system may comprise a single vessel or a plurality of vessels. The impact force attenuation system including one or more vessels can also be attached to objects of fixed location or objects substantially stationary relative to an impacting body to so protect the stationary object or the impacting body or both from the forces and other effects associated with the impact.

Figure 3:
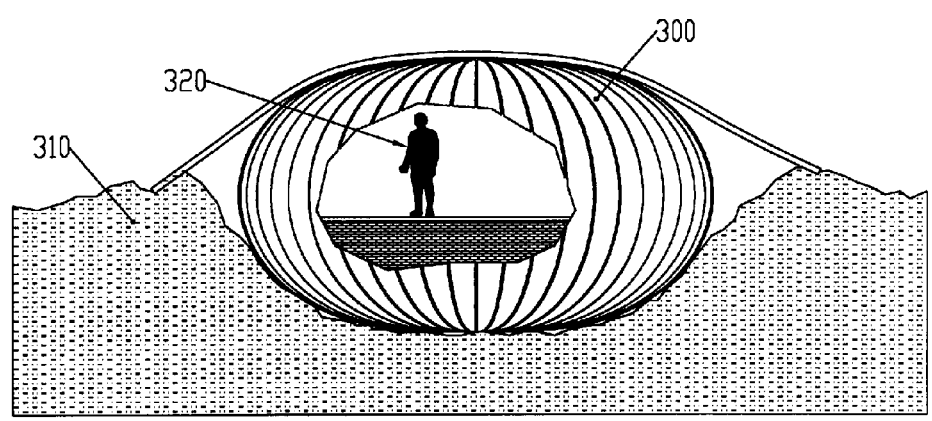
FIG. 3 is a schematic view of a vessel used as a human habitat according to an example embodiment.

FIG. 3 is a schematic view of a vessel used as a human habitat according to an example embodiment. The vessel 300 is large enough to be occupied by one or more humans 320 as shown in FIG. 3. In general the vessel can be dimensioned to provide an internal environment commensurate to the spatial requirements of the material objects, substances, systems, or life forms to be contained within the vessel.

It should be noted that the applications shown in FIGS. 1, 2 and 3 of the vessels are just a few of the possible vessel applications. Now turning to the remaining figures, various vessels and methods for forming the vessels will be further detailed.

Figure 4:
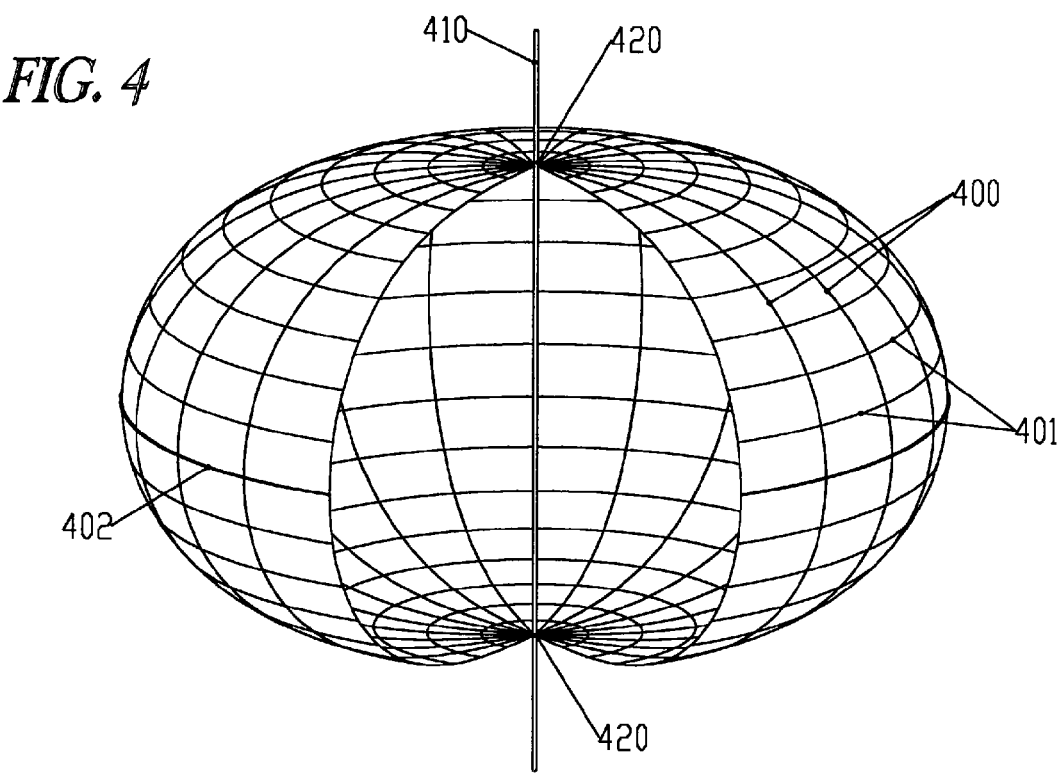
FIG. 4 is a schematic cut-away perspective view showing the surface of revolution geometry of the vessel according to an example embodiment.

One example embodiment will be discussed with respect to FIGS. 4-9. FIG. 4 illustrates the so-called 'natural shape' spheroidal geometry of one example embodiment of the present invention. FIG. 4 shows meridional grid lines 400, circumferential grid lines 401 and an axis of revolution 410. The meridians 400 and circumferences 401 are perpendicular to one another; however, while the circumferences 401 are parallel to one another, the meridians 400 are non-parallel, converge at the poles 420, and achieve greatest separation at the vessel's equator 402. If the spheroidal vessel shell is disassembled along its meridians 400, the resulting pieces are three dimensional, doubly curved shell segments, which when recombined, would present the original closed shell. In the context of flexible vessels it is important to note that meridians 400 can be used to define the edges of meridional 'gores' which are the two dimensional approximations of the shell segments described above. Being two dimensional, gores can be cut from planar sheets of material, and like the shell segments referred to above, subsequently can be connected edge to edge to reproduce a close facsimile of a fully closed three dimensional shell. The primary discrepancy is that the 'manufactured' shell is undesirably facetted between its meridians 400; however, this effect can be diminished by increasing the number of meridians 400 and the ensuing number of gores.

Considerable vessel flexibility and resilience is required to allow efficient folding and packaging of the vessel or of any architecture of which the vessel is part. To be flexible, the vessel's barrier structure wall needs to be relatively thin. In one example embodiment, the vessel's barrier structure wall is less than one-tenth its smallest radius of curvature. When such a thin-walled structure is subjected to such distributed loading as internal pressure, the predominant stresses are membrane stresses, i.e. stresses constant throughout the thickness of the wall. The internal pressure imparts stress in two principle directions: a meridional membrane stress $s_m$ acting parallel to the meridian 400, and a circumferential or hoop membrane stress $s_c$ acting parallel to the circumference 401.

Figure 5:
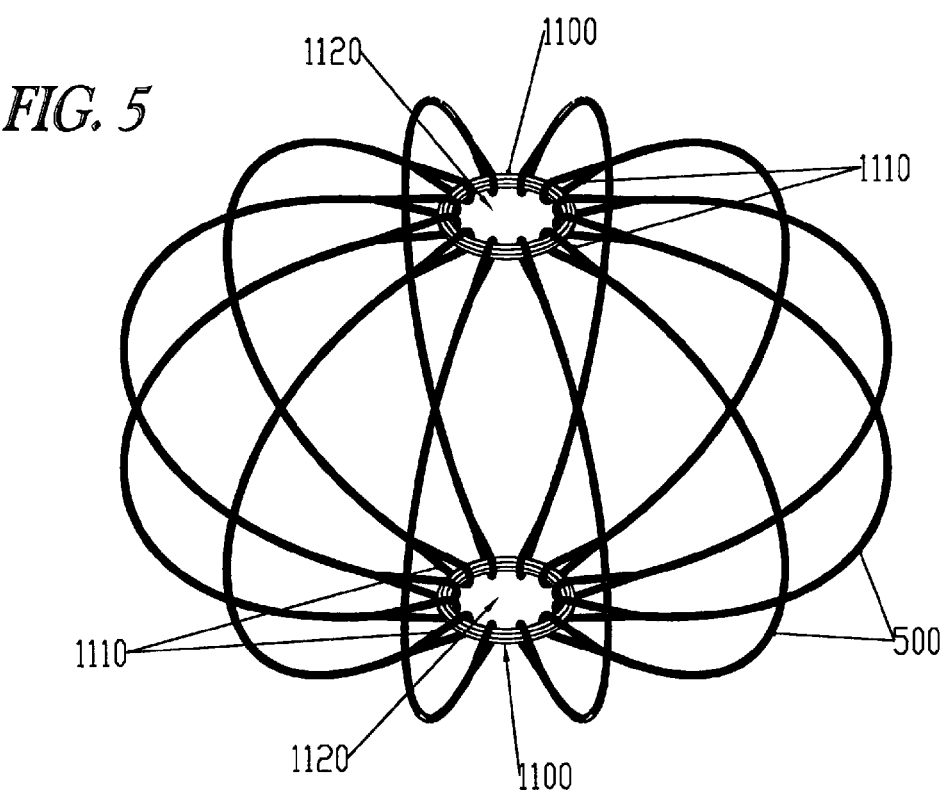
FIG. 5 is an isometric view of the vessel's restraint structure with flexible end structures, according to an example embodiment.
Figure 6:
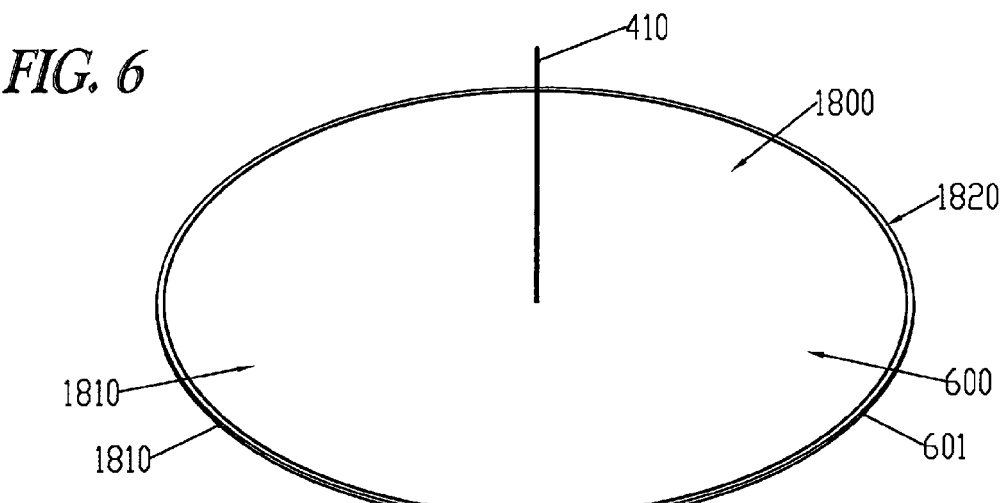
FIGS. 6, 7 and 8 are isometric views illustrating a procedure to develop the geometry of the vessel according to an example embodiment.
Figure 7:
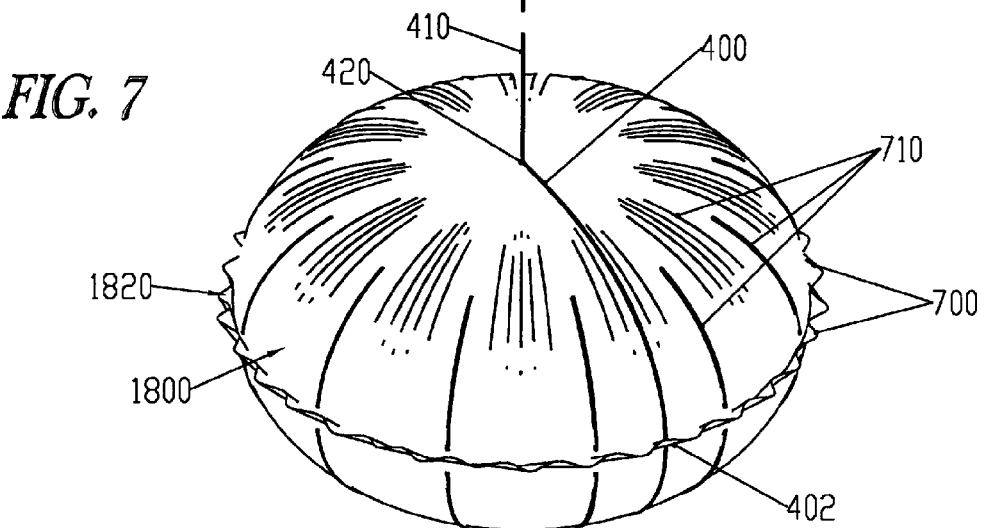
Figure 8:
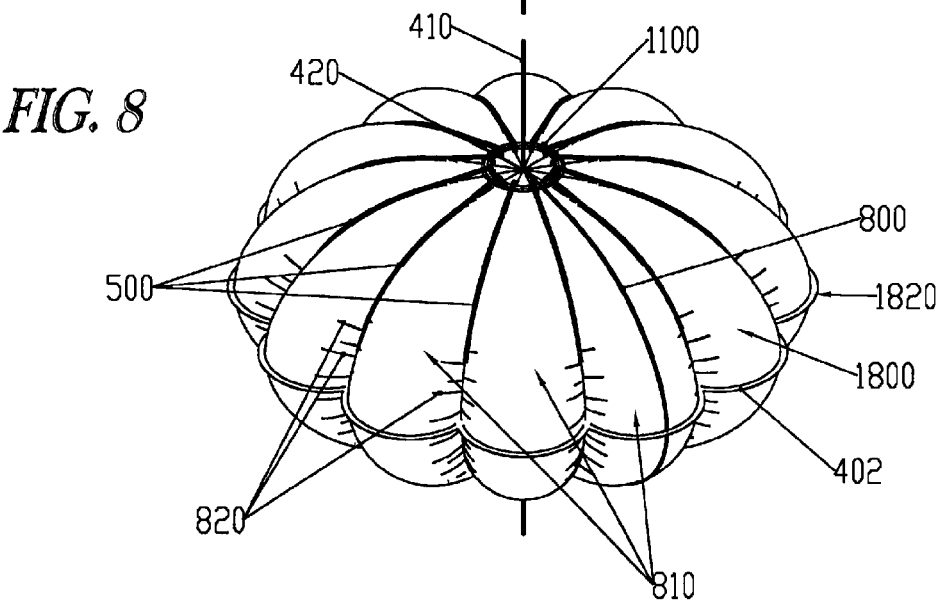
Figure 9:
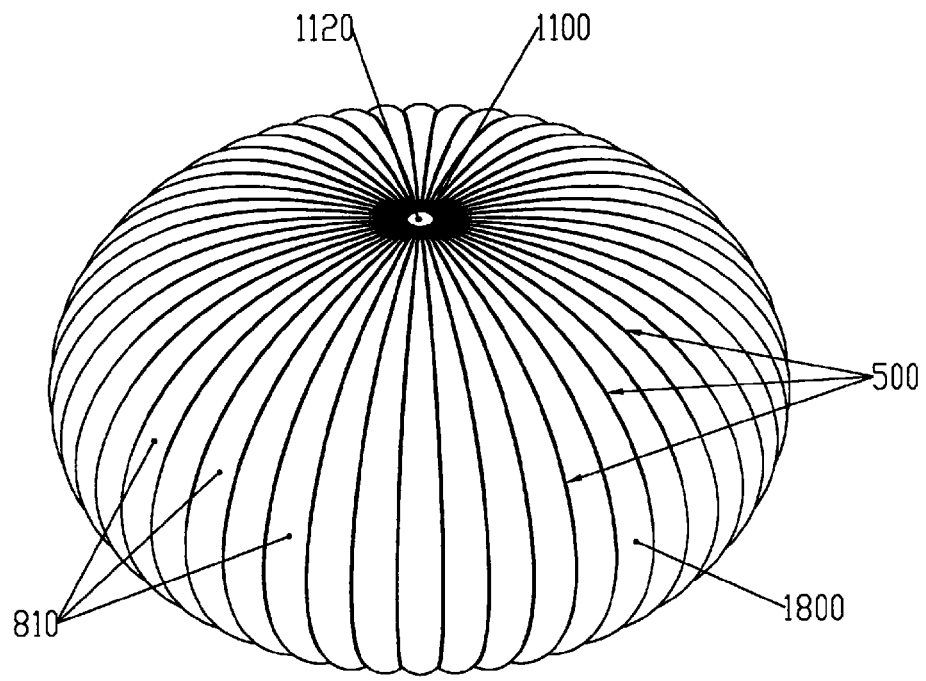
FIG. 9 is an isometric view of the vessel with flexible polar end structures according to an example embodiment.
Figure 10:
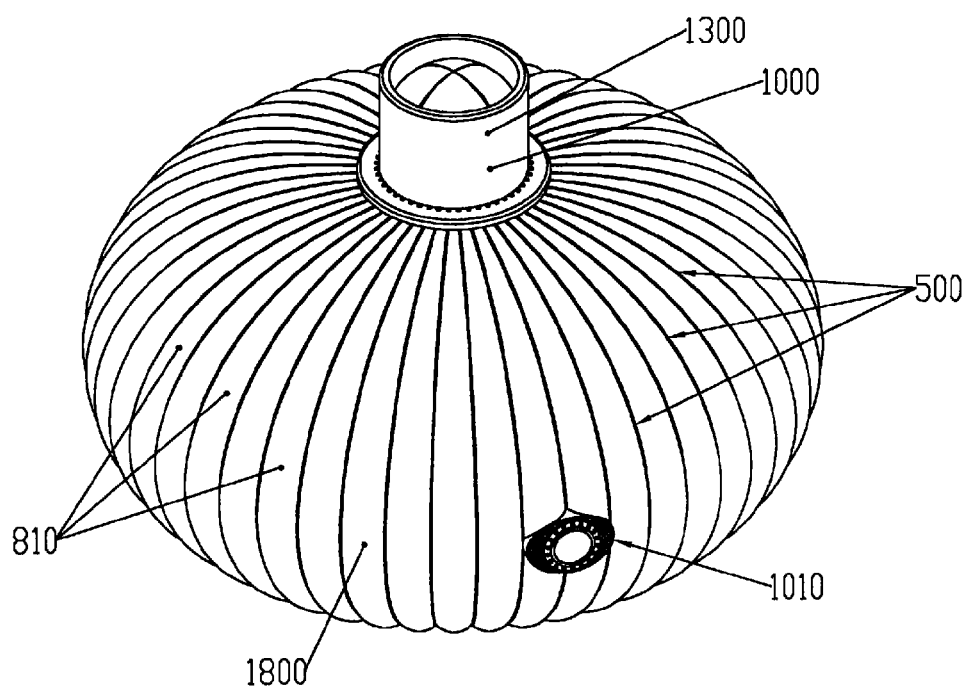
FIG. 10 is an isometric view of the vessel with rigid polar end structures and an equatorial pass through according to an example embodiment.

Simply stated, the one embodiment of the vessel as shown in FIG. 9 comprises a substantially impervious barrier membrane structure 1800 confined by a pressure restraint structure as shown in FIG. 5 consisting of a meridional array of tendons 500 disposed between and connected to a flexible end structure 1100 at each of the vessel's poles 420 (see FIG. 4). In FIGS. 6, 7 and 8 the geometric premise of the current invention is conveniently demonstrated by considering a Mylar® balloon. In one example embodiment a Mylar® balloon simulates the barrier structure 1800 and a method of construction thereof. As shown in FIG. 6, the Mylar® balloon is made by sealingly connecting two same size circles 600 of impervious Mylar® barrier film material to one another along their edges. For the theoretical purposes of this explanation the film material is assumed to be substantially inelastic thereby also resembling the barrier structure 1800 of the invention. The Mylar® balloon is axisymmetric, i.e. it is symmetrical about the axis of rotation 410 passing through its two poles 420 (see FIG. 4) which are at the respective centers of the two circles of film 600.

Prior to inflation, the balloon's initial radius $r_i$ and equatorial circumference $c_i$ are defined by the radius and circumference of the Mylar® film's circular perimeter. As the balloon begins inflating, the center areas of the two circles of film 600 are pushed apart by the increasing volume of gas within the sealed membrane, resulting simultaneously in the balloon's perimeter being drawn towards the balloon's axis 410 (see FIG. 4). With the perimeter thus being drawn inwards, the balloon's circumference also becomes correspondingly shorter, forcing the film material to display increasingly conspicuous waviness 700 around its perimeter in its effort to contract its length $c_i$ to match the balloon's newly reduced circumference. Radial wrinkles 710 in the circles of film material emanate from the perimeter undulations; with increasing inflation the perimeter waviness 700 becomes larger as do the radial wrinkles 710 which are now more aptly described as meridional.

The pertinent observation in the context of the present invention and of the Mylar® balloon is that, from the very instant that the vessel begins inflating and the film circles 600 depart from their planar form, the balloon's circumferential membrane stress $s_c$ substantially disappears, leaving substantially all of the vessel's global membrane stress to be borne only in the meridional direction of the inflated membrane. The elimination of $s_c$ is readily rationalized by considering that, as the balloon inflates, any circle drawn upon the surface of the Mylar® film concentric to the film's circular edge is displaced closer to the balloon's central axis 410, i.e. to a circular location of reduced circumference. This displacement presents excess film material in the circumferential sense thereby giving rise to radial wrinkles 710. These wrinkles 710 could not form in the presence of appreciable circumferential stress.

Upon full inflation the balloon does not assume the volume-to-surface area optimized shape of a sphere but rather, in the absence of circumferential membrane stress $s_c$, takes on the very specific spheroidal 'natural shape' [4] [6], as shown in FIGS. 4 and 7, with an equator 402 (see FIG. 4) defined by the junction of the two constituent Mylar® film circles 600 and whereby each of the two film circles 600 has functionally deformed from an initially two dimensional planar shape to a three dimensional doubly curved hemispheroid. A cross section of the inflated balloon through its axis of rotation 410 reveals the distinctive profile curve of the balloon's natural shape where the arc length of one quadrant, i.e. one half of the length of a meridian 400, equals the radius $r_i$ of the planar Mylar® film circles 600 shown in FIG. 6 and as such the length of a full meridian 400 equals $2r_i$. The inflated balloon shown in FIG. 7 presents a final radius $r_f$ and final circumference $c_f$ both measured in the equatorial plane, where $r_f$ is given by $$r_f = \frac{1}{\sqrt{2}} \frac{r_i}{K}$$

where K originates as an elliptic integral of the first kind in the analysis of the natural shape, presenting a value of approximately 1.8541 upon calculation [4] [6], and $r_i$ is the radius of the planar film portion.

As shown in FIGS. 5 and 8 a meridional array of substantially identical tendon cords 500, each of the same $2r_i$ meridional length of the inflated Mylar® balloon is now superimposed upon the inflated balloon. If subsequently the length of these tendons 500 is gradually and uniformly shortened, the array will begin to draw the balloon's surface inwards in the vicinity of the tendon paths, thereby absorbing an increasing amount of the balloon's excess meridional film material stored within the radial wrinkles 710 (as shown in FIG. 7). Because the length of the meridian described by a tendon is less than the length of the balloon's meridian $2r_i$, circumferential wrinkles 820 to accommodate the corresponding meridional excess of film material must form in the vicinity of tendons. With continued shortening the tendons 500 increasingly restrain the balloon thereby bearing a progressively greater portion of the vessel's pressure load. The meridional dimension of the balloon remains essentially unaltered in areas not drawn inwards by the tendons 500, however as shown in FIG. 8, a configuration is ultimately encountered wherein the tendons 500 have drawn all balloon material inwards, the length of the meridian 800 of the crest of the balloon material lobes 810 between tendons 500 finally drops below $2r_i$, and the meridional tautness along the lobe crest of the balloon film disappears. It is at this point that substantially the last of the global pressure induced stress is transferred from the balloon film material to the restraint structure.

One example embodiment presents a meridional array of tendons 500 such as described above, whereby more specifically the length of the restraint's tendons 500 is defined such that, within the application dependant range of pressures associated with the vessel's deployed configuration, the vessel's barrier structure 1800 is substantially relieved of any meridionally oriented pressure induced load. The barrier structure 1800 is thereby permitted to substantially carry only the local hoop stress within its own bulges bridging the gap between tendons 500. Since membrane stress induced by distributed internal pressurization is proportional to the radius of membrane curvature and since the radius of the barrier bulges is small with respect to the vessel radius, the barrier is subjected to correspondingly low stress. While the restraint structure bears the global pressure confining load of the vessel, the strength requirement of the barrier structure 1800 remains independent of overall vessel size. The formation of bulging lobes 810 of barrier structure material with the introduction of the restraint structure is evidence that the global circumferential stress component remains substantially absent therefore causing the surface geometry of restraint structure to continue assuming the same natural shape, albeit of smaller scale, as the unrestrained balloon, regardless of the length of its tendons 500, and whereby the natural shape can be described as the geometry of equilibrium found when, through elimination of circumferential stress, the global pressure confining stress of the vessel is substantially carried only by the meridional tendons.

The vessel of the one embodiment as described thus far offers superlative stability, predictability and reproducibility because firstly, the vessel's natural shape geometry is obtained by default regardless of tendon 500 length and secondly, the vessel's global stress distribution can be made substantially statically determinate by directing the vessel's global pressure induced stress to the vessel's restraint structure while concurrently substantially eliminating the meridional tautness in the vessel's barrier structure 1800. Prepared as described above, the vessel of the present invention also presents significant versatility and opportunity for strength-to-weight ratio optimization by allowing tendon and the barrier structure materials, according to design drivers, to be precisely tailored to one another by juxtaposing the number of restraint tendons 500 with barrier structure lobe radius. The stresses borne by the flexible vessel's membrane are not only limited to loads induced by the contents of the vessel, pressurized or not, but also include loads produced by external factors.

It is important to note that in certain circumstances it may be desirable to take advantage of the meridional load carrying capacity of suitably strong barrier structure material thereby allowing the barrier structure 1800 to share a portion of the vessel's global stress with the restraint structure. While the benefit hereby is the optimized application of structural mass, the drawback is the imprecision of load partitioning between the restraint and barrier structures 1800.

The vessel developed and described in detail above and shown in FIG. 9 represents one embodiment of the vessel whereby the vessel's restraint structure comprises only a meridional array of tendons 500 disposed between and structurally connecting two flexible polar end structures 1100.

Restraint End Structure

Figure 11:
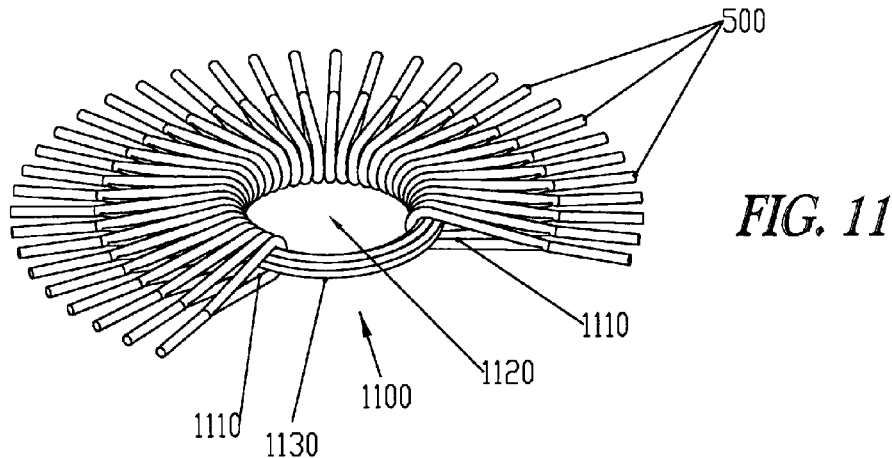
FIG. 11 is a partial detail view of the vessel's array of restraint structure tendons fastened to a flexible polar end structure comprising one end structure ring according to an example embodiment.

One of the challenges in forming some flexible vessels is maintaining the vessel's flexibility in polar areas where tendons 500 or other structural members or constructs converge. FIG. 5 shows an example embodiment of a vessel's restraint having flexible end structures 1100. The flexible end structures will now be discussed in further detail referring to the end structure detail views shown in FIGS. 11 and 12. An individual flexible end structure 1100 is shown in FIG. 11. The individual flexible end structure 1100 includes a piece of high modulus cordage, adequate in length to allow the cord to be threaded in several loops through the eye 1110 of one polar end of all the restraint tendons 500 to so form a ring structure 1130 of multiple strands. The tendons 500 are securely connected to the ring structure 1130 by the eye 1110 of the tendons 500. The dimensional intent in the preparation of the end structure's ring structure is to minimize the diameter of the cordage ring to preclude undue loading of the underlying barrier structure and, as such if necessary, to the extent there is only adequate space on the ring structure to accommodate the width of all the individual tendon eyes 1110 laid side by side. Despite the great loads imparted upon the ring structure in the vessel's deployed configuration, utilizing cordage of smaller diameter allows easier threading of the cord through the tendon eyes 1110, dilution of the weakness of the connection joining the two cord ends, and easier and less voluminous connection of cord ends to one another. Furthermore, depending on requirements, more than one length of cordage may be individually threaded through the aforementioned tendon eyes 1110 to so together form a ring structure benefiting from redundancy, notably in cord end connections.

The end structure 1100 describes an aperture 1120. The aperture 1120 must be sufficiently small to preclude excess loading of the underlying barrier structure 1800. The barrier structure 1800 can be reinforced in the region of the aperture 1120 to support a larger aperture 1120 if desirable, for example to accommodate larger pass throughs.

Figure 12:
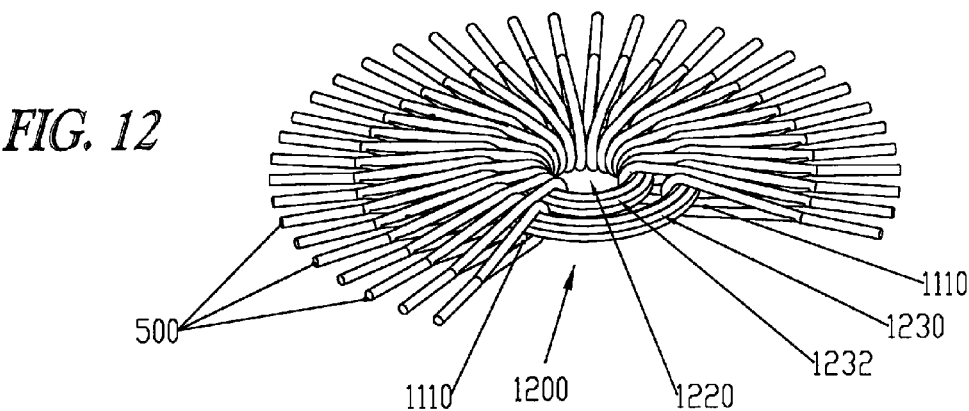
FIG. 12 is a partial detail view of the vessel's tendon array fastened to a flexible polar end structure comprising two end structure rings according to an example embodiment.

FIG. 12 illustrates an end structure 1200 having an aperture 1220. Larger vessels and higher pressure loads may result in a larger end structure aperture 1220 due to increased tendon convergence bulk so that in some embodiments it is advantageous to incorporate two or more of the aforementioned ring structures positioned concentrically to serve as a single flexible polar end structure 1200 to allow staggered attachment of tendons 500. FIG. 12 includes an outer or a first ring structure 1230 and an inner second ring structure 1232. The aperture 1220 differs from the aperture 1120 (shown in FIG. 11) in that multiple ring structures surround the aperture 1220. The aforementioned configuration of multiple concentric ring structures is especially suitable for high pressure vessels for containment of liquefied propellants and the like. The flexible end structure 1200 shown in FIG. 12 incorporates two such ring structures whereby the outer ring structure 1230 passes through all the tendon eyes 1110 of tendons 500 corresponding with and converging upon their respective pole 420 (shown in FIG. 4) of the vessel, and the inner ring structure 1232 passes through alternating eyes 1110 of the aforementioned tendons 500. Depending on requirements the outer ring structure 1230 may or may not pass through all the aforementioned tendon eyes 1110, and in general, it is important to note that the pattern with which tendons 500 connect to a flexible end structure 1100 comprising multiple rings can be tailored to requirements. The ring structures can also be adapted for incorporation into a system to secure the vessel to other architecture.

Figure 14:
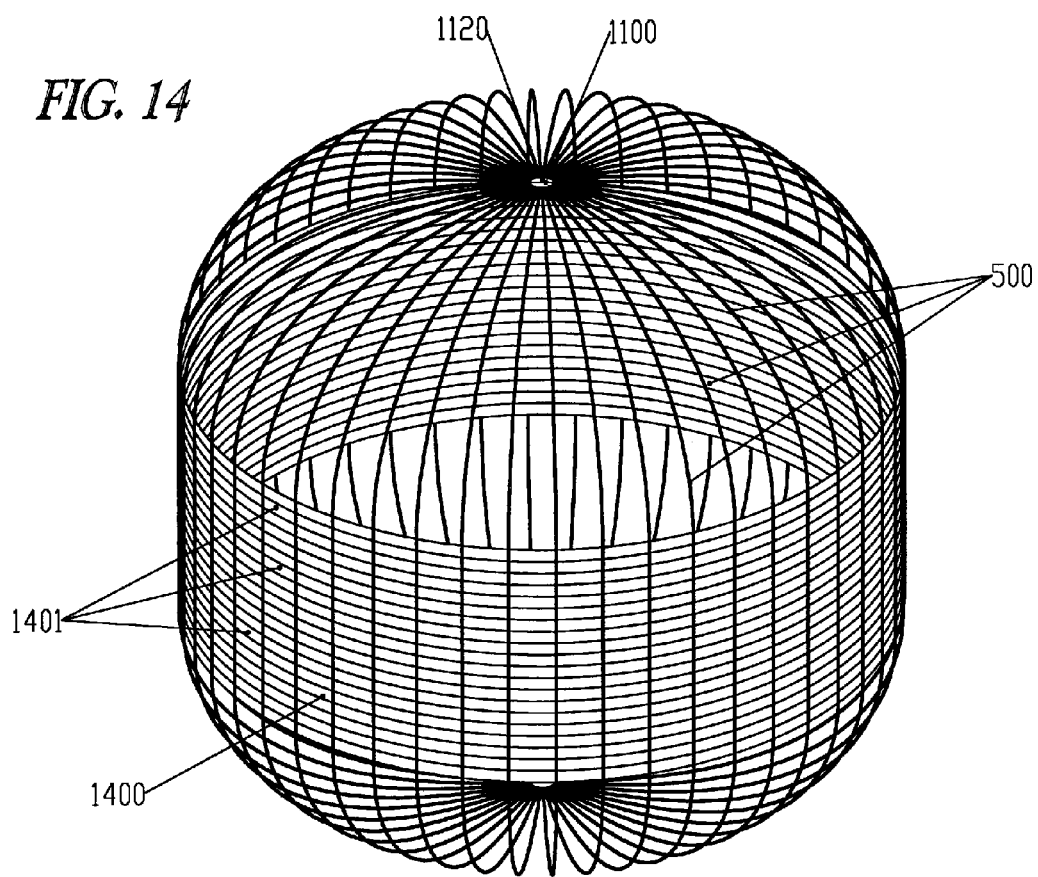
FIG. 14 is an isometric view of an elongate vessel's restraint structure with a cylindrical circumferential restraint structure comprising webbing straps according to an example embodiment.

Incorporating the flexible end structures described thus far the embodiments of the vessel shown in FIGS. 2 and 9, and the vessel's restraint embodiments shown in FIGS. 5 and 14, have no significant rigid components. The aforementioned embodiments provide a broad potential range of application, and provide numerous benefits such as greater compressibility and higher deployment efficiency ratio, lighter weight with resulting higher strength-to-weight ratio, greater resistance to handling, packaging and deployment trauma, and reduced cost. Applications which either require or benefit from an almost or entirely flexible vessel capability include devices suitable for dynamic loading such as airbag cushions, deceleration ballutes, floatation bladders, and tanks for the storage and transport of pressurized fluids, and the like.

Figure 13:
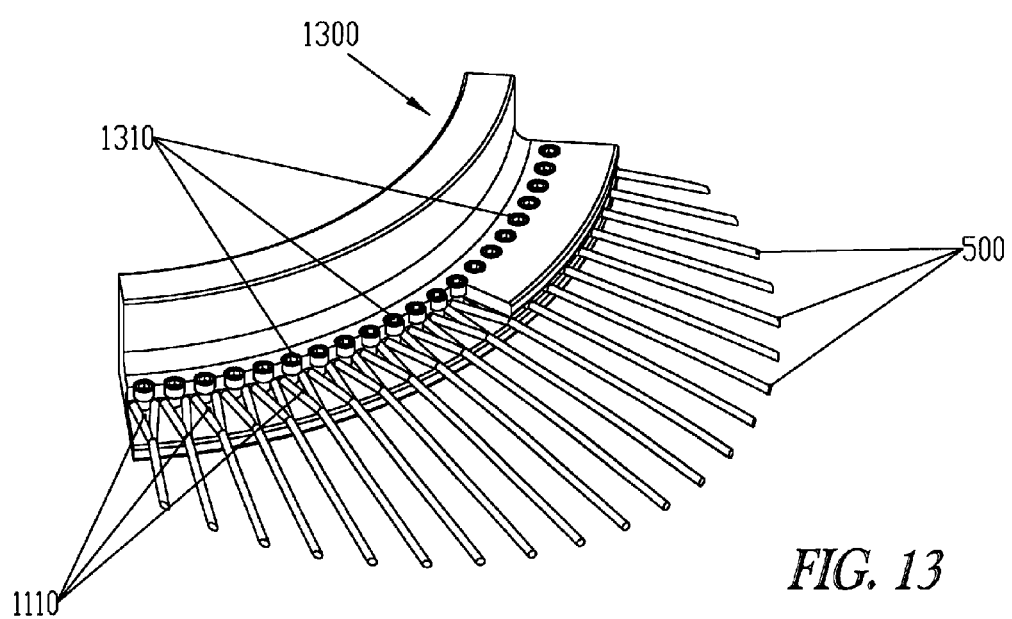
FIG. 13 is a partial cut-away view showing a suitable method for fastening restraint tendons to a rigid polar end structure according to an example embodiment.

FIG. 13 shows an example embodiment of a vessel's restraint incorporating a rigid end structure 1300. Some applications require a vessel with one or more rigid components. Vessel designs providing alternative embodiments not only incorporate, but rely upon, large rigid polar end structures 1300. The embodiments of the vessel shown in FIGS. 1, 3, 10, 20 and 22 incorporate a rigid end structure 1300 at one or both vessel poles 420 (shown in FIG. 4), or accommodate a mating structure such as a docking tunnel 1000 (shown in FIGS. 10, 20, 21 and 22), air lock 100 (shown in FIG. 1) or the like, to which the vessel's tendons 500 are structurally attached by connection devices such as bolts 1310 (shown in FIG. 13), clevises, shackles, karabiners and the like. If required the tendon eyes 1110 may alternately be spliced directly to a suitably accommodating rigid end structure 1300 thereby eliminating the need for separate fastening devices, or alternately, the end structure 1100 of a flexible end structure embodiment of the present vessel may be prepared with an adequately large aperture 1120 to allow its fitment to a suitably accommodating rigid mating structure.

Restraint Tendons

Depending on requirements and design priorities, the vessel of the invention's restraint components may be constructed of cordage, cable, webbing, and the like. Due to its relatively higher strength-to-weight ratio, cordage is the preferred restraint tendon material, and therefore cordage assumes a substantial role in the design and construction of the vessel of the invention. All fiber products contemplated hereinafter for incorporation into the restraint structure of the vessel of the invention are assumed to be manufactured of high modulus, high tenacity variety fibers such as Vectran®, PBO, and Technora® The fiber product Technora® is available from Teijin Limited of Japan. Of course, other high modulus, high tenacity fiber products can be used, as well as a combination of different high modulus, high tenacity fiber types together in an individual fiber based restraint component. Operational requirements would indicate a fiber type preference based on fiber attributes such as temperature sensitivity, abrasion resistance, flex fatigue resistance, chemical and radiation sensitivity and creep. Unless alternately required, a further preference of the invention is, where cordage is employed, to incorporate single braid cordage construction. Single braid construction is cordage prepared without a protective woven sheath, as opposed to double braid construction whereby the cordage is prepared with a protective woven sheath, typically at time of manufacture. Without the weight of the sheath single braids offer lower weight than corresponding double braids of same strength. In instances where protective covering for the cordage is essential, flexible light weight polymer coatings of considerable variety are commonly available. Other coatings or tubular sleeves may be appropriate fitted onto the tendon 500 to provide, for example, a smoother or larger diameter tendon bearing surface to reduce bearing surface trauma to the vessel's distended barrier structure 1800.

In one embodiment, the meridional restraint tendons 500 of the vessel of the invention are prepared from high modulus fiber cordage and furnished with a spliced eye 1110 at both ends which allow the tendon's structural connection to the vessel's respective polar end structures. In the example embodiment of the restraint tendon 500, the tendon's eyes 1110 can be prepared in advance of the tendon's integration to so help facilitate modular assembly of the vessel. Alternately the eye 1110 can be spliced directly to a flexible end structure 1100 or rigid end structure thereby eliminating connection fittings.

The tendons 500 of the vessel's restraint structure must be prepared in such a way to enable their precise connection to the underlying barrier structure 1800 for positional indexing purposes. Accurate physical indexing of vessel components is a vital requirement for the preservation of intended load pathways and is of particular importance in structures, such as the vessel of the invention, which incorporate materials comprising high modulus fibers. The indexing connection should ideally allow modular assembly of components and must be of sufficient strength to maintain its integrity throughout the contemplated manufacturing and operational parameters which the vessel is to be subjected to.

Figure 18:
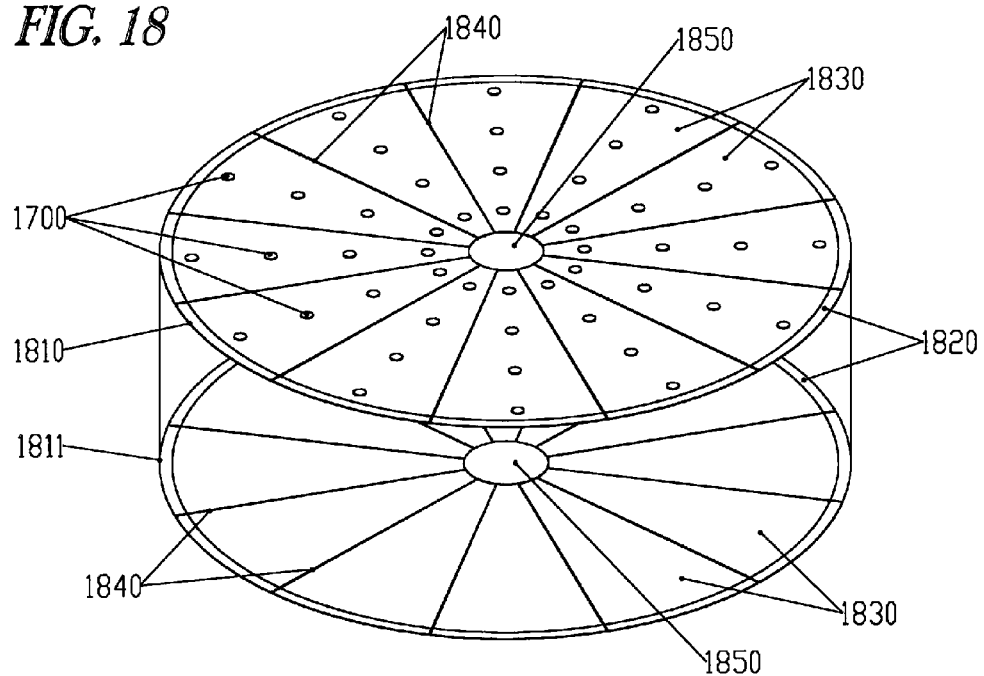
FIG. 18 is a simplified perspective view of the two component circles of barrier structure material prepared for assembly of the vessel's barrier structure according to an example embodiment.
Figure 19:
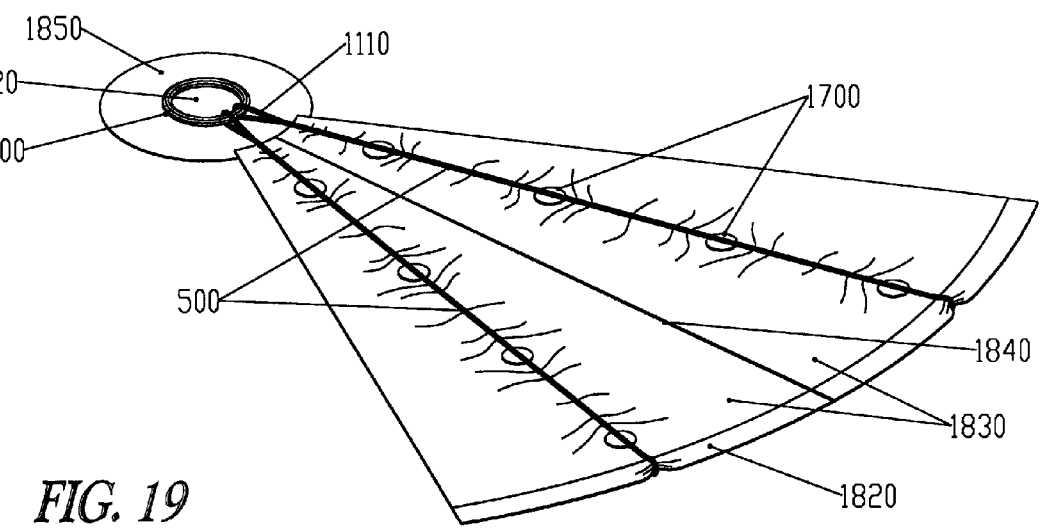
FIG. 19 is a partial perspective view of two restraint tendons fastened to the vessel's barrier structure according to an example embodiment.

FIG. 16 is an isometric detail view of an indexing tab fastened to a restraint tendon. FIG. 17 is an isometric detail view of a method for locally fastening a restraint tendon to the vessel's barrier structure 1800 according to an example embodiment. Now referring to both FIGS. 15 and 16, the relationship between the indexing tab, the restraint tendon and the barrier structure will be further detailed. As shown in FIG. 16 a mating half of a fastening device 1600 is attached to the tendon 500 with sewn stitches 1610 at requirement specified intervals whereby, at time of vessel assembly, the aforementioned tendon fastening device can be structurally mated to the corresponding mating half 1700 of a like fastening device attached with sewn stitches 1710 to the surface of the barrier structure 1800 as shown in FIGS. 17, 18 and 19. It should be noted that there are a great number of potential fastening devices available. In one embodiment, the fastening devices include adhesive pads, heat activated bonding pads, and hook and loop fasteners. In circumstances not requiring modular assembly, especially in smaller vessel construction, it may prove more efficient to directly attach tendons 500 to the barrier structure 1800 with intermittent or continuous stitching, or by another alternate method. Another method to fasten straps and cordage to fabric items is by passing the tendon 500 through a sleeve affixed to the fabric surface. This method is employed in parachute deployment systems and the like, and therefore conspicuously applicable to the current invention's restraint tendon 500 to barrier structure 1800 connection, wherein it is advantageous to keep the tendon 500 captive over a substantial portion of the length of the tendon to reduce chance of fouling upon deployment. In the context of the present invention the tendon 500 may be indexed to the material of the sleeve mentioned above, or to the barrier structure 1800 surface where the sleeve is discontinuous, by employing a fastening device of a type mentioned earlier.

The circumferential wrinkles 820 of barrier structure material in the vicinity of restraint tendons 500 which accommodate the meridional excess of barrier material arising from the discrepancy in meridional length between tendons and barrier structure 1800 provides substantial latitude in the geometric indexing of barrier structure 1800 to the restraint structure. The aforementioned latitude provides the vessel of the invention with a substantial tolerance for material and manufacturing imperfections and therefore is of significant benefit in the vessel's manufacturing and integration processes, as well as a key enhancement of the vessel's resilience with respect to tight and imperfect packaging, different packaging configurations, and imperfect deployment sequences.

Additional Restraint Structure Embodiments

Another example embodiment of a vessel restraint structure is shown in FIG. 14. The geometry of the embodiment shown in FIG. 14 can be formed by sectioning the spheroidal geometry of the vessel embodiment shown in FIGS. 4-9 at its equator, and connecting each of the two resulting hemispheroidal end caps to the respective open ends of a cylinder. The result is the geometry of the elongated embodiment of the vessel, the restraint structure of which is shown in FIG. 14. The aforementioned elongate embodiment resembles a conventional pressure vessel and allows additional configurational and dimensional flexibility whereby the meridional array of the elongate embodiment of the vessel's tendons 500 remains substantially unaltered by the addition of an elongating center section to the vessel other than that the tendons 500 are provided with an additional length accommodating the dimensions of the vessel's central elongation. The vessel's circumferential stress in the cylindrical, constant diameter middle section is contained by the addition of a circumferential component 1400 to the vessel's meridional array of restraint tendons.

Depending on requirements, the aforementioned circumferential restraint component 1400 comprises fabric, film or substantially parallel hoops of tendons or straps 1401. FIG. 14 shows the restraint structure of an elongate embodiment of the current invention wherein the center section is a cylindrical shell whereby the circumferential component 1400 of the vessel's restraint structure is prepared with a plurality of webbing straps 1401 positioned adjacent one another. An individual circumferential strap 1401 may be prepared by sewing the two ends of an individual piece of webbing together to so form the closed loop of the finished strap 1401. The straps 1401 are then positioned side by side and abutting one another to so allow their mutual connection to so form the cylindrical circumferential component 1400 of the vessel's restraint structure. The circumferential straps 1401 may be connected to one another with, for example, a sewn butt seam.

Figure 15:
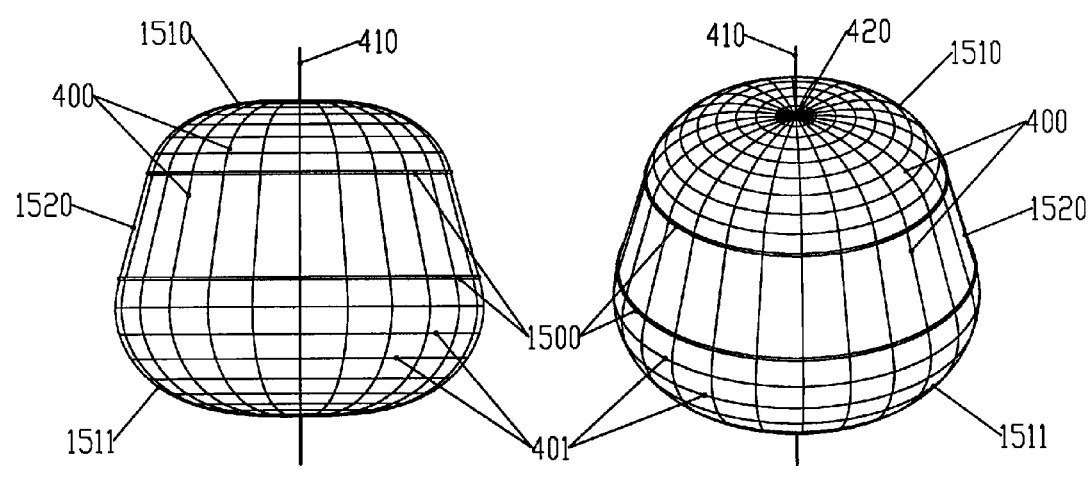
FIG. 15 provides two schematic views of elongate vessel geometry with frustoconical center section according to an example embodiment.

In similar fashion FIG. 15 shows an alternate elongate embodiment of the vessel providing the characteristically tapered profile of a space capsule or atmospheric entry ballute and which is obtained by sectioning the spheroidal geometry of the substantially spheroidal embodiments shown in FIGS. 4-9 at a parallel 1500 other than the equator 402. The result of the aforementioned sectioning is two end caps which are subsequently resized to allow for their attachment to their respective open ends of a conic frustum 1520. A substantially natural shape, with its associated benefits, is maintained as default geometry for the vessel's end caps 1510 and 1511 regardless of their resizing or of the parallel chosen as location for partitioning of the invention's spheroidal embodiment. An elongate embodiment of the invention may incorporate a cylindrical or conical center section between the vessel's two end caps, or a combination of cylindrical and conical parts.

Barrier Structure 1800

FIG. 18 is a simplified perspective view of two component circles, 1810 and 1811, of barrier structure material prepared for assembly of the vessel's barrier structure 1800 according to an example embodiment. FIG. 19 is a view of two restraint tendons 500 fastened to the vessel's barrier structure 1800 according to an example embodiment. Now referring to both FIGS. 18 and 19, construction of the barrier structure will be further detailed. The vessel's barrier structure 1800 contains the gaseous or liquid fluids within its envelope. Solid objects may be comprised within the fluid contained within the barrier structure 1800. The barrier structure 1800 comprises at least one structural carrier layer confining one or more substantially impervious bladder layers. Bladder redundancy is a likely requirement especially in man-rated space structure designs. Similarly, incorporation of more than one carrier may be suitable especially if the incorporation of fabrics prepared of different structural fiber types is considered advantageous. For convenience hereinafter bladder and carrier are each referred to in singular with the understanding that, depending on the context or unless otherwise noted, 'bladder' refers to single or multiple bladders and 'carrier' refers to single or multiple carriers.

Bladder layers and carrier layers may be combined into a single thicker, less flexible laminate to reduce assembly complexity, however an embodiment of the invention is to present the substantially impervious bladder and the structural carrier as separate shells within the barrier structure 1800 whereby the carrier envelops the bladder thereby maintaining the elongation of the bladder below a threshold of diminished impermeability. A primary benefit of segregated carrier and bladder is to maintain the flexibility required for efficient collapsibility of vessels with very high strength shells and their consequently heavier, less flexible structural layers. Segregating carrier and bladder also eliminates the substantial complexity of accurately indexing the two layers throughout the laminating process to achieve reproducible results. Mutual indexing of segregated barrier and carrier layers is possible using the fastening methods described earlier (see 'Restraint Tendons'). The term 'barrier structure material' is a term of convenience referring to the collection of carrier and bladder layers comprised by the wall of the barrier structure 1800.

As shown in FIG. 18 an example embodiment of the vessel's barrier structure 1800 is prepared by sealingly connecting two substantially planar circles, 1810 and 1811, of barrier structure material to one another along their edges 1820 thereby offering the advantages and performance characteristics explained in detail above in the context of the Mylar® balloon. If separate carrier and bladder shell layers are to be used in construction of the barrier structure 1800, many assembly options are available. For example: After initial preparation of two separate circles each of both carrier and barrier materials, the bladder is made substantially impervious by sealing the bladder circle edges together, after which the carrier circles may be indexed to their respective sides of the bladder to be subsequently closed around their edges thereby enveloping the bladder. For most applications, the required diameter of the circular barrier material components will exceed the manufactured width of the source materials thereby requiring the circles to be fabricated of a plurality of pie shaped gores 1830. When connected to one another, the aforementioned gores 1830 form a substantially planar circle whereby the gore connection seams 1840 form a radial pattern emanating from the circle's center. The circle center corresponds to the deployed vessel's poles 420 (shown in FIG. 4) and the circle's radial gore connection seams forms a pattern of meridional seams when the vessel is deployed.

As shown in FIGS. 18 and 19 the tips of the pie shaped barrier structure gores 1830 converge upon the vessel's pole 420 (shown in FIG. 4) and are there connected to a circle of barrier structure material known as the 'top cap' 1850 to avoid the convergence of gore connection seams to a single point. The top cap 1850 may be reinforced to accommodate the pressure induced load resulting from a large end structure apertures 1120 and 1220. In the vessel of the present invention, the seams 1840 joining the barrier structure gores 1830 in the vessel's deployed configuration are thus aligned in the same meridional sense as the array of restraint tendons 500. Seams are less flexible than their constituent material pieces due to the physical bulk of material needed to prepare the seam exacerbated by the stiffness imparted by the seam fastening mechanism. Therefore, the embodiment of the vessel of the present invention shown in FIG. 19 provides for the barrier structure seams 1840 to be offset from the restraint tendon paths thereby preserving greater vessel flexibility by avoiding a further confluence of material and the associated stiffness resulting from such a confluence.

A planar barrier structure presents significant benefits, primarily for vessel assembly and integration, some of which are: The calculational aspects of design are simplified throughout vessel development; planar components are easier to prepare and join; easier assembly leads to homogeneity of construction, enhanced reproducibility, and greater average strength; quality control is easier to perform; incorporation of local modifications, especially those for increased strength and reinforcement, is simplified; and pass-throughs frames for portholes 1010 (shown in FIG. 10), service conduits and the like are more accurately and easily integrated.

In the same fashion used to assemble most balloon type structures, an alternate embodiment of the vessel's barrier structure 1800 is constructed of a plurality of conventional meridional gores of the type described earlier in the discussion of FIG. 4 and employing the methods of construction described above. In a further embodiment of the aforementioned vessel's meridional gore barrier structure, the pattern of gore connection seams is offset from the pattern of meridional tendons 500 in the same fashion as presented above in the discussion of barrier structure circles 1810 prepared with pie shaped gores 1830, thereby likewise avoiding the confluence of material along the vessel's tendon paths.

Barrier Bladder

In an example embodiment the substantially impervious bladder of the vessel of the present invention is assembled from two substantially planar circles of bladder material whereby the circles are, if dimensionally so required, each fabricated as described above from a plurality of sealingly connected pie shaped gores. The two bladder circles thus prepared are subsequently sealingly attached to one another at their edges. In an alternate embodiment the bladder of the vessel can be constructed of a plurality of conventional meridional gores as described earlier. In the case that the vessel of the invention incorporates one or more rigid polar end structures 1300 which further include a pass through opening in their structure, the barrier bladder will be sealingly attached to the rigid end structure 1300 employing sealing and gasketting methods.

Barrier Carrier

The primary roles of the carrier is to: provide a substrate to which the restraint structure is connected and whereby the connection points facilitate the desired indexing between restraint structure and barrier structure 1800; to bear the local stresses, induced by the pressurized bladder, generated where the barrier bulges outwards between restraint tendons 500 and; to restrict elongation of the bladder such that the bladder does not display diminished imperviousness. An example embodiment has the structural integrity of the carrier structure being dependent only upon its load bearing function for the short spans between restraint tendons 500, and independent of the overall size of the vessel. As described earlier in detail, the vessel's restraint tendons 500 can be calibrated to preclude meridional loading of the carrier structure. Therefore, to improve strength-to-weight ratio, the carrier is ideally prepared from an unbalanced fabric weave of high tenacity, high modulus fiber whereby the high strength direction of the carrier fabric, featuring low elongation, less crimped fibers, is oriented perpendicular to the restraint tendons 500. The aforementioned weave types are found in many sailcloths and frequently enhanced with a further directional reinforcement of high-modulus fibers. A further example embodiment takes advantage of the meridional load carrying capacity of suitably strong carrier material to allow the carrier to share a portion of the vessel's global content constraining load with the restraint structure. While the benefit hereby is the optimized application of structural mass, the drawback is the imprecision of load partitioning between the restraint and barrier structures 1800.

Internal Core

Figure 20:
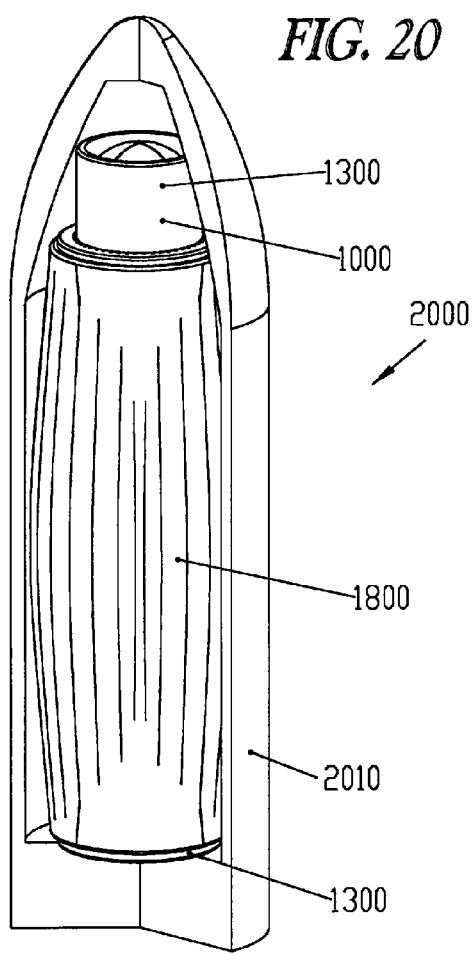
FIG. 20 is a cut-away view of a vessel with rigid polar end structures and telescopic core, showing the vessel in its collapsed configuration positioned within a rocket payload fairing according to an example embodiment.
Figure 21:
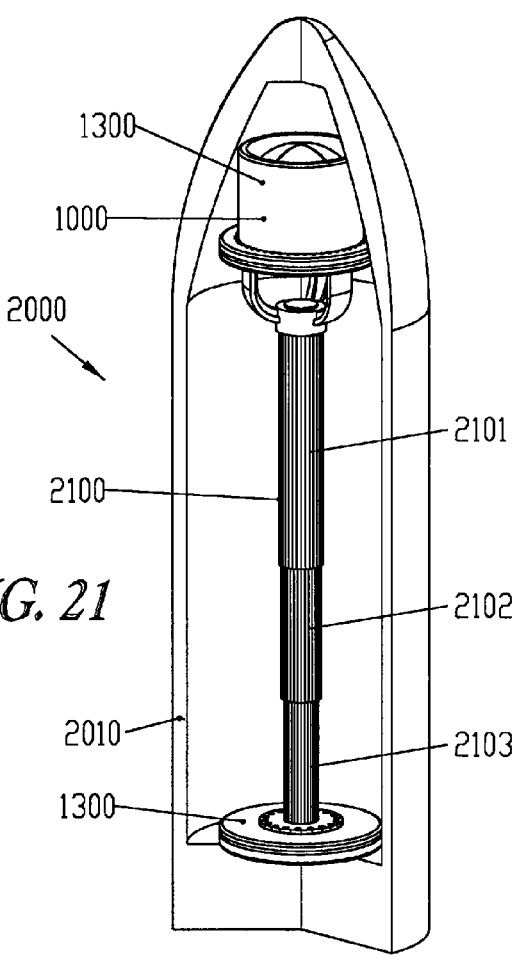
FIG. 21 is a cut-away view of the vessel shown in FIG. 20, showing the vessel's end structures and telescopic core corresponding to the vessel's collapsed configuration positioned within a rocket payload fairing according to an example embodiment.
Figure 22:
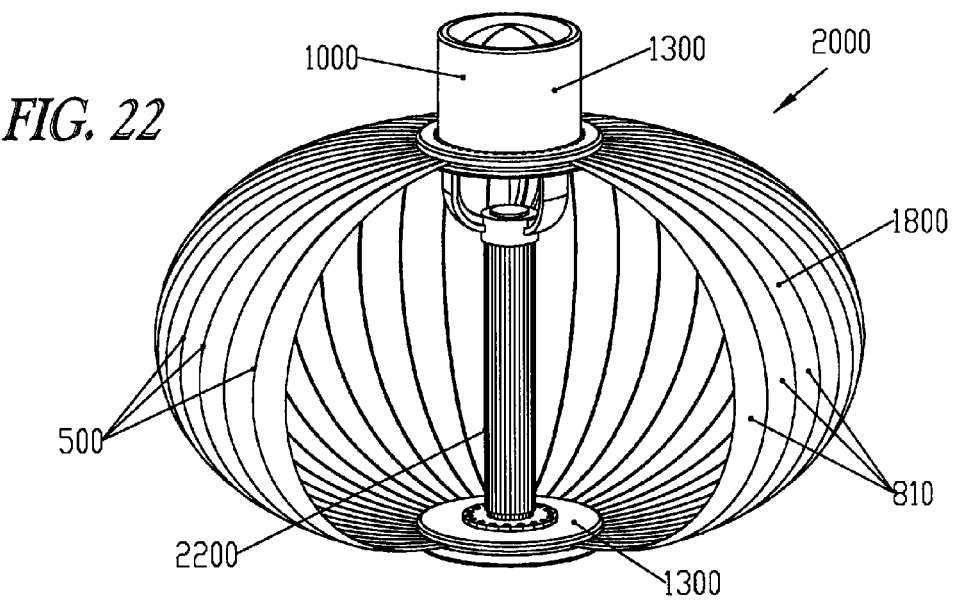
FIG. 22 is a simplified partial cut-away view of the vessel in its deployed configuration according to an example embodiment.

Some applications favor the incorporation of an internal structural core. FIGS. 20-22 show a vessel 2000 that includes a flexible barrier structure 1800, and an extendable core 2100 positioned between a pair of rigid end structures 1300. FIG. 20 is a cut-away view of the vessel with rigid polar end structures 1300 and telescopic core in its collapsed configuration positioned within a launch vehicle payload fairing 2010. FIG. 21 is a cut-away view of the vessel shown in FIG. 20 with the flexible barrier portion removed to more clearly show the vessel's end structures and telescopic core 2100 when in the collapsed configuration. FIG. 22 shows the vessel 2000 in its deployed configuration. The core 2100 is disposed lengthwise between and connected to the two polar end structures. The core 2100 includes a first telescopic component 2101, a second telescopic component 2102, and a third telescopic component 2103. It should be noted that other embodiments may have a different number of telescopic components. FIG. 22 shows the core 2100 when deployed. The core 2100 shown in FIG. 22 corresponds to the distended, deployed configuration of the vessel's flexible barrier portion. The extended core 2100, as shown in FIG. 21, pushes the end structures apart allowing the shell to collapse and align itself with the core. By varying the pressure within the telescopic core, considerable control of both packaging and deployment can be achieved, especially when the aforementioned core pressure is varied in concert with the pressure within the vessel. The global geometric shape of the deployed vessel can also be axially modified by varying the length the core 2100. Further benefits of a structural core are dependent upon application of the vessel but may include structural integrity to support rocket launch induced stress and to house infrastructure and operational hardware such as avionics and life support systems.

Other Features

Other example embodiments are also contemplated. Example embodiments include a pass through to accommodate a rigid porthole structure 1010 (shown in FIG. 10); internal fastenings to allow attachment of internal structures such as partitions, floors, protective bladder liners and bulkheads; exterior fastenings and adaptations for incorporation of the vessel of the invention into, for example, human habitation architecture for deployment in a space environment; exterior fastenings permitting the vessel's outer surface to form a substrate for micrometeoroid and orbital debris shielding and other relevant structures. The substantial portion of the aforementioned embodiments involve integration of the vessel of the invention with other architecture and comprise the attachment of accessories to the vessel whereby such attachment is readily accomplished with suitable fastening devices and methods.

Examples of architecture deployed in outer space, or otherwise on or about celestial bodies, into which the invention could be suitably incorporated or which the invention is directly suitable for include but are not limited to: structures whose deployed dimensions are larger than what can be accommodated in storage or by the intended transport vehicle; inflatable vessels for human habitation, transport and protection; storage structures for equipment and supplies; vessels for containment of pressurized gaseous or liquid propellants, oxidants and pressurants, cryogenic or otherwise; devices suitable for dynamic loading such as airbag cushions, deceleration ballutes and floatation bladders; and inflatable airlocks, docking and berthing mechanisms, and connection tunnels generally facilitating a controlled environment connection between different architectures including vehicles.

In summary, a flexible vessel includes a restraint structure and a barrier structure. The restraint structure further includes a first portion, and a second substantially rounded end cap portion that is attached to the first portion. The restraint structure also includes an array of tendons. The barrier structure is positioned within the restraint structure. When the barrier contains a fluid, a portion of the load is carried by the restraint structure and another portion of the load is carried by the barrier structure. The flexible vessel is collapsible to occupy a first volume and distended to occupy a second volume. The second volume is larger than the first volume. In some embodiments, the barrier includes a high-modulus structural carrier portion. The barrier structure includes at least one bladder. The bladder generally includes a substantially impervious portion. In one embodiment, the barrier structure includes a first substantially planar circle of barrier material, and a second substantially planar circle of barrier material. The second substantially planar material is attached to the first substantially planar material near the edge of each planar circle. In another embodiment, the barrier structure includes a first meridional gore of barrier material, a second meridional gore of barrier material, and a third meridional gore of barrier material which are attached to one another to form the barrier structure. In this embodiment, a seam of the barrier structure is offset from the tendons of the restraint structure. The barrier structure is oversized with respect to the restraint structure. The tendons of the restraint structure are also disposed in a meridional array. In one embodiment, the tendons connect the first end structure and the second end structure. The barrier structure is attached to the tendons of the restraint structure in some embodiments. To promote the flexibility of the vessel having a plurality of seams, in some embodiments, the seams of the barrier structure are offset from the tendons of the restraint structure.

In some embodiments, the restraint structure further includes a body portion positioned between the first portion and the second rounded end portion. In some embodiments, the body portion of the restraint structure includes a cylindrical portion, or a frustoconical body portion. In other embodiments, the first portion is a first rounded end substantially hemispheroidal in shape and the second rounded end is substantially hemispheroidal in shape. The second rounded end cap portion is substantially flexible. The second rounded end cap portion includes a ring of flexible, high modulus material. In still other embodiments, the flexible vessel includes a core that includes an end structure. The geometric shape of the flexible vessel in a deployed configuration varies in response to the length of the core. The core can include a telescoping structure to allow the length of the core to be varied in the deployed flexible vessel. Thus the same flexible vessel can be deployed in various configurations since the length of the core can be changed to produce changes in the geometry. In some embodiments, the second rounded end cap further includes a flexible end structure, and in still other embodiments, the second rounded end cap further includes a rigid end structure.

A system includes a craft and a flexible vessel. The flexible vessel has a first volume corresponding to a collapsed configuration, and a second volume corresponding to a deployed configuration. The first volume is smaller than the second volume. The craft has an opening for enclosing the flexible vessel when in the collapsible position. The flexible vessel of this system also includes a restraint structure and a barrier structure. The restraint structure includes a first portion, and a second substantially rounded end cap portion attached to the first portion. The restraint structure includes an array of tendons. The barrier structure is positioned within the restraint structure, wherein the barrier is adapted to contain a fluid and wherein a portion of the load is carried by the restraint structure and another portion of the load is carried by the barrier structure, the flexible vessel collapsible to occupy a first volume and distended to occupy a second volume, the second volume larger than the first volume. The flexible vessel is movable between the collapsed configuration and the deployed configuration and back to the collapsed configuration. In some embodiments, the flexible vessel, when deployed, is used to attenuate impact forces associated with the craft. In other embodiments, the flexible vessel, when deployed, is positioned as passageway between the craft and another architecture or as an airlock between the craft and the environment exterior to the craft. A craft can be any type of body. The restraint structure of the flexible vessel includes a plurality of tendons disposed in a meridional array. The tendons connect a first polar end structure and a second polar end structure. The barrier structure is attached to the tendons of the restraint structure. The barrier structure of the system is oversized with respect to the restraint structure.

In the context of the vessel's geometry and load pathways, the claims and description of the present invention employ the term 'substantially', or a term similar in meaning thereto, because there may exist factors in individual applications causing incremental departure from the theoretical characteristics of load partitioning between structural components of the vessel as described herein. The aforementioned factors may be unintentional, for example being effected by material constraints, or intentional, such as modified load paths to incorporate a large pass-through.

Although various embodiments have been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense.

The foregoing description of the specific embodiments reveals the general nature of the technology sufficiently that others can, by applying current knowledge, readily modify and/or adapt it for various applications without departing from the generic concept, and therefore such adaptations and modifications are intended to be comprehended within the meaning and range of equivalents of the disclosed embodiments. It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. An apparatus comprising:
    a restraint structure including a meridional array of tendons structurally connected to at least one polar end structure; and
    a barrier structure positioned within the restraint structure and substantially impervious to a fluid contained within an enclosed volume of the barrier structure, the barrier structure oversized with respect to the restraint structure thereby substantially limiting a load on the barrier structure to local stresses generated where the barrier structure bulges outwards between the tendons, the barrier structure having radius $r_f$ at a perimeter when fully distended and having an initial two dimensional planar circle in which the perimeter has radius $r_i$ before inflation, wherein $r_f$ and $r_i$ are centered about an axis of rotation passing through the at least one polar end structure, whereby $r_i$ is greater than $r_f$.

2. The apparatus of claim 1 wherein the barrier structure further comprises:
    a first meridional gore of barrier material;
    a second meridional gore of barrier material; and
    a third meridional gore of barrier material, wherein the first, second, and third meridional gores of barrier material are attached to one another.

3. The apparatus of claim 1 wherein a seam of the barrier structure is offset from a tendon.

4. A system comprising:
    a restraint structure including a meridional array of tendons structurally connected to at least one polar end structure; and
    a barrier structure positioned within the restraint structure and substantially impervious to a fluid contained within an enclosed volume of the barrier structure, the barrier structure oversized with respect to the restraint structure thereby substantially limiting a load on the barrier structure to local stresses generated where the barrier structure bulges outwards between the tendons, the barrier structure having radius $r_f$ at a perimeter when fully distended and having an initial two dimensional planar circle in which the perimeter has radius $r_i$ before inflation, wherein $r_f$ and $r_i$ are centered about an axis of rotation passing through the at least one polar end structure, whereby $r_i$ is greater than $r_f$; and
    a craft having an opening therein configured for enclosing the restraint structure and the barrier structure when the barrier structure is collapsed.

5. The system of claim 4 wherein the barrier structure can be sequentially collapsed, distended, and then collapsed.

6. The system of claim 4 wherein the restraint structure and the barrier structure are configured to attenuate impact forces associated with the craft.

7. The system of claim 4 wherein the restraint structure and the barrier structure serve as at least one of an airlock and a passageway.

8. The apparatus of claim 1 wherein at least one polar end structure includes a first ring.

9. The apparatus of claim 8 wherein the at least one polar end structure includes a second ring and wherein the first ring is concentric with the second ring.

10. The apparatus of claim 1 wherein at least one polar end structure is flexible.

11. The apparatus of claim 1 wherein at least one polar end structure is rigid.

12. The apparatus of claim 1 further comprising a core connected to at least one polar end structure.

13. The apparatus of claim 12 wherein the core is telescopic.

14. The apparatus of claim 1 wherein the restraint structure includes at least one of a cylindrical portion and a frustoconical portion.

15. The apparatus of claim 1 wherein the barrier structure includes at least one bladder.

16. The apparatus of claim 1 wherein the barrier structure includes a high-modulus structural carrier portion.

17. The apparatus of claim 1 wherein the barrier structure can be sequentially collapsed, distended, and then collapsed.

18. A method comprising:

provided a restraint structure including a meridional array of tendons structurally connected to at least one polar end structure; and providing a barrier structure for positioning within the restraint structure, the barrier structure substantially impervious to a fluid contained within an enclosed volume of the barrier structure, the barrier structure oversized with respect to the restraint structure thereby substantially limiting a load on the barrier structure to local stresses generated where the barrier structure bulges outwards between the tendons, the barrier structure having radius $r_f$ at a perimeter when fully distended and having an initial two dimensional planar circle in which the perimeter has radius $r_i$ before inflation, wherein $r_f$ and $r_i$ are centered about an axis of rotation passing through the at least one polar end structure, whereby $r_i$ is greater than $r_f$.

* * * * *

UNITED STATES PATENT AND TRADEMARK OFFICE
CERTIFICATE OF CORRECTION

| | | |
|---|---|---|
| PATENT NO. | : 8,186,625 B2 | Page 1 of 1 |
| APPLICATION NO. | : 11/463560 | |
| DATED | : May 29, 2012 | |
| INVENTOR(S) | : Maxim De Jong | |

It is certified that error appears in the above-identified patent and that said Letters Patent is hereby corrected as shown below:

Title page Item (75) inventor, line 1, delete "De" and insert --de,--, therefor

Title page Item (73) assignee, line 1, before "Thin" delete "The", therefor

Signed and Sealed this
Twenty-ninth Day of January, 2013

David J. Kappos
*Director of the United States Patent and Trademark Office*